(12) United States Patent
Leigh et al.

(10) Patent No.: US 9,430,041 B2
(45) Date of Patent: Aug. 30, 2016

(54) METHOD OF CONTROLLING AT LEAST ONE FUNCTION OF DEVICE BY USING EYE ACTION AND DEVICE FOR PERFORMING THE METHOD

(71) Applicant: SAMSUNG ELECTRONICS CO., LTD., Suwon-si (KR)

(72) Inventors: Sang-won Leigh, Yongin-si (KR); Kyung-hwa Yu, Seoul (KR); Jun-seok Lee, Seoul (KR); Jin-yong Chung, Seoul (KR); Sung-goo Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/383,703

(22) PCT Filed: Mar. 6, 2013

(86) PCT No.: PCT/KR2013/001787
§ 371 (c)(1),
(2) Date: Sep. 8, 2014

(87) PCT Pub. No.: WO2013/133618
PCT Pub. Date: Sep. 12, 2013

(65) Prior Publication Data
US 2015/0015483 A1    Jan. 15, 2015

(30) Foreign Application Priority Data
Mar. 6, 2012   (KR) .................. 10-2012-0022882

(51) Int. Cl.
*G09G 5/00*   (2006.01)
*G06F 3/01*   (2006.01)
(Continued)

(52) U.S. Cl.
CPC ............ *G06F 3/013* (2013.01); *G06F 3/048* (2013.01); *G06K 9/00597* (2013.01)

(58) Field of Classification Search
CPC .... G06F 3/013; G06F 3/048; G06K 9/00597
USPC ........................................................ 345/156
See application file for complete search history.

(56) References Cited

U.S. PATENT DOCUMENTS 6,637,883 B1   10/2003   Tengshe et al.
7,488,294 B2 *  2/2009   Torch ........................... 600/558
(Continued)

FOREIGN PATENT DOCUMENTS

JP              4839432 B2      12/2011
KR      10-2000-0072494 A      12/2000
(Continued)

OTHER PUBLICATIONS

International Search Report (PCT/ISA/210) dated Jun. 14, 2013, issued in International Application No. PCT/KR2013/001787.
(Continued)

*Primary Examiner* — Gustavo Polo
(74) *Attorney, Agent, or Firm* — Sughrue Mion, PLLC

(57) ABSTRACT

A method of controlling a device by an eye action is provided. The method includes selecting a controller to execute a control command generated by the eye action of a user, obtaining data about the eye action of the user, detecting the control command corresponding to the eye action of the user based on the obtained data, and executing the detected control command by using the selected controller.

14 Claims, 14 Drawing Sheets

(51) Int. Cl.
*G06F 3/048* (2013.01)
*G06K 9/00* (2006.01)

(56) References Cited

U.S. PATENT DOCUMENTS

2002/0180799 A1  12/2002  Peck et al.
2011/0175932 A1   7/2011  Yu et al.

FOREIGN PATENT DOCUMENTS

KR   10-2007-0043469 A   4/2007
KR   10-2007-0078574 A   8/2007
KR   10-2011-0083770 A   7/2011

OTHER PUBLICATIONS

Written Opinion (PCT/ISA/237) dated Jun. 14, 2013, issued in International Application No. PCT/KR2013/001787.

* cited by examiner

FIG. 3

| | EYE ACTION |
|---|---|
| open | KEEPING EYES OPEN |
| blink | QUICKLY BLINKING EYES |
| short_click | CLOSING EYES SHORTLY AND OPENING THEM AGAIN |
| click | OPENING EYES AFTER CLOSING THEM (CLICK) |
| long_click | OPENING EYES AFTER CLOSING THEM FOR LONG PERIOD OF TIME |
| close | KEEPING EYES CLOSED |
| dwell | GAZING AT ONE SPOT FOR LONG PERIOD OF TIME |

METHOD OF CONTROLLING AT LEAST ONE FUNCTION OF DEVICE BY USING EYE ACTION AND DEVICE FOR PERFORMING THE METHOD

CROSS-REFERENCE TO RELATED APPLICATION

This application is a national phase application of international application number PCT/KR2013/001787, filed on Mar. 6, 2013, which claims priority from Korean Patent Application No. 10-2012-0022882, filed on Mar. 6, 2012, in the Korean Intellectual Property Office, the disclosures of which are incorporated herein in their entireties by reference.

BACKGROUND

1. Technical Field

Apparatuses and methods consistent with exemplary embodiments relate to controlling at least one function of a device by analyzing an eye action of a user and a device for performing the method.

2. Description of the Related Art

A mouse is a type of a computer input device that tracks a user's motion in order to move a cursor on a display screen and may also include buttons that allow a user to execute various tasks by pressing the buttons. Due in part to this relatively simple way of use, a mouse is presently widely used as an input device together with a keyboard.

A mouse may be classified into a ball mouse, an optical mouse, and a gyroscopic mouse (air mouse) depending on what driving method is implemented therein. For example, a ball mouse is a mechanical mouse which includes a small ball that is rotated in various ways to determine directions and compute distances for moving a cursor. However, as foreign substances can easily attach to the ball of the ball mouse, the sensitivity of the ball mouse is significantly reduced.

In an optical mouse, light is emitted from a bottom area and an optical sensor mounted in the bottom area is configured to sense changes of the light reflected back toward the bottom area. Currently, the optical mouse is the most widely used mouse type input device. The optical mouse may be further classified into an optical mouse, a laser mouse, and a blue track mouse according to a sensor thereof.

A gyroscopic mouse is a mouse which does not require ground contact. The gyroscopic mouse includes a gyroscopic sensor to sense three-dimensional (3D) motions along X, Y, and Z axes according to an inclination of the gyroscopic mouse. A wireless type gyroscopic mouse is generally used. The gyroscopic mouse is also referred to as an "air mouse" because the gyroscopic mouse is used in air.

However, some people with disabilities have difficulties using the above-mentioned mice as input devices. Accordingly, an eye mouse has been developed. An eye mouse is a special mouse that may be used by disabled people, which is designed to move a cursor on a computer screen according to the eye motion of a user.

SUMMARY

In accordance with an aspect of an exemplary embodiment, there is provided a method of controlling at least one function of a device by using an eye action, the method comprising: selecting a controller to execute a control command generated by an eye action of a user; obtaining data about the eye action of the user; detecting a control command corresponding to the eye action of the user based on the obtained data; and executing the detected control command by using the selected controller.

The selecting of a controller may be performed based on an input of the user.

The selecting of a controller may be performed based on at least one of application information and a web browser address.

The selecting of a controller may be performed based on at least one device information and usage environment information.

The controller may be at least one selected from the group consisting of a mouse controller, a keyboard controller, a touch input controller, a programmable controller arbitrarily defined by the user, and a controller corresponding to an application.

The data about the eye action may include at least one of eye blinking information, eye gaze position information, and eye movement speed information.

The method may further include displaying information about the selected controller.

The method may further include outputting an alarm signal when an eye action corresponding to a previously set alarm request is detected.

The method may further include: receiving a request to modify an eye action corresponding to a predetermined control command from the user; providing an editing window to modify the eye action corresponding to the predetermined control command in response to the request; receiving modified eye action information corresponding to the predetermined control command from the user via the editing window; and generating a programmable controller arbitrarily defined by the user based on the modified eye action information.

According to an aspect of another exemplary embodiment, there is provided a device comprising: a selecting unit to select a controller to execute a control command that is generated by an eye action of a user; an obtaining unit to obtain data about the eye action of the user; a detecting unit to detect a control command corresponding to the eye action of the user based on the obtained data; and a processing unit to execute the detected control command by using the selected controller.

BRIEF DESCRIPTION OF THE DRAWINGS

The above and/or other aspects of the disclosure will become apparent and more readily appreciated from the following description of exemplary embodiments, taken in conjunction with the accompanying drawings, in which:

FIG. 3 is a schematic view for explaining an eye action according to an exemplary embodiment;

DETAILED DESCRIPTION

Figure 1:
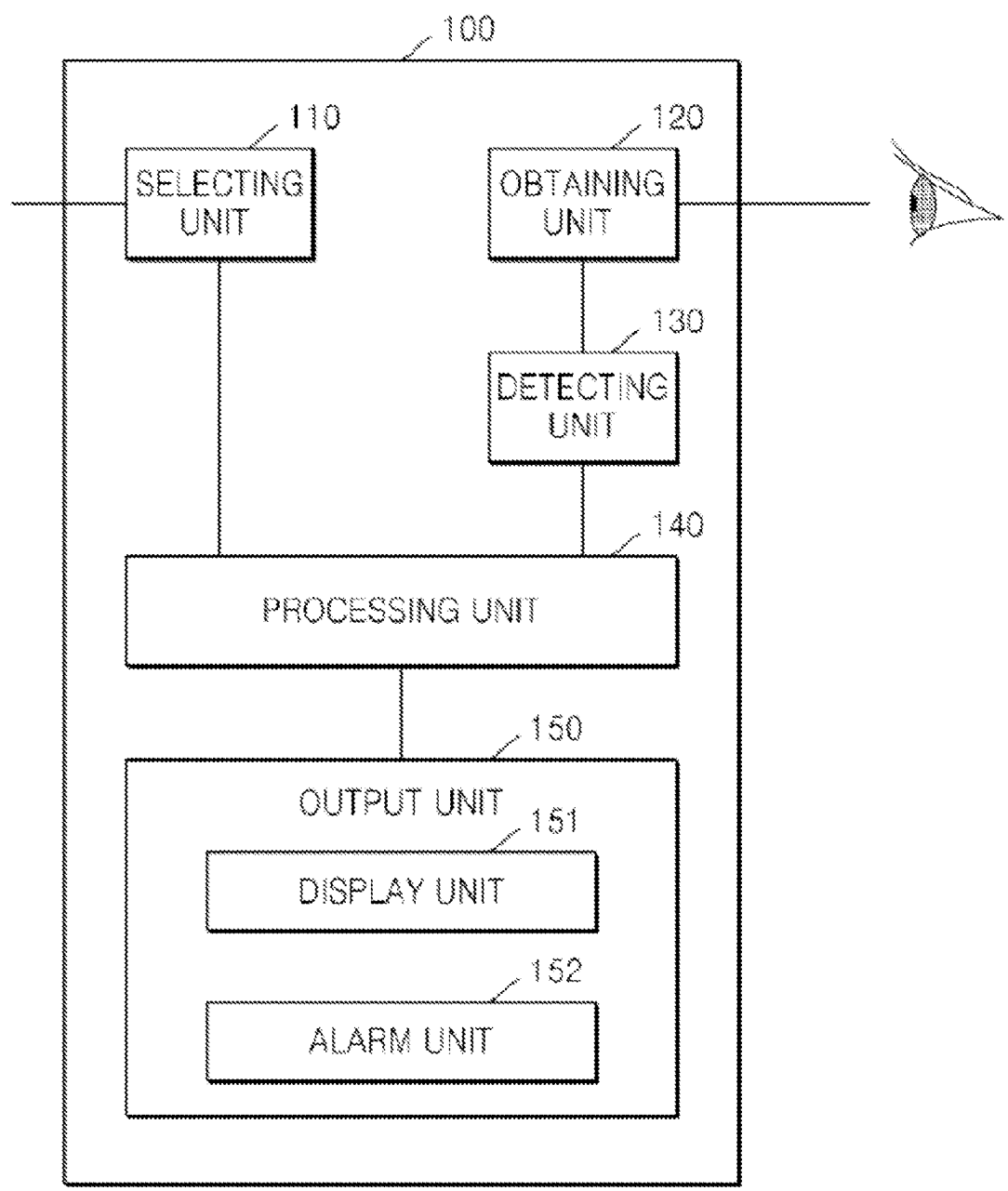
FIG. 1 is a structural block diagram illustrating a device used in an exemplary embodiment.

Reference will now be made in detail to the exemplary embodiments of the present disclosure, examples of which are illustrated in the accompanying drawings, wherein like reference numerals refer to like elements throughout.

The present invention provides a method of controlling at least one function of a device by automatically selecting a controller to execute a control command generated by an eye action or by selecting the controller based on a user's input corresponding to an eye action of the user.

According to an exemplary embodiment, a device may allow user to control many kinds of input apparatuses including a mouse by using an eye action.

The terms used herein will be first briefly described, and then, the present invention will be described then in detail.

Most of the terms used herein are general terms that have been widely used in the technical art to which one or more exemplary embodiments pertain. However, some of the terms used herein may be created to reflect the intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of one or more exemplary embodiments.

When a unit "comprises" an element in the entire specification, the unit does not exclude another element but may further comprise another element unless the context clearly indicates otherwise. In addition, terms such as " . . . unit", "module", and the like used herein indicate a unit for performing at least one function or operation and may be implemented by hardware or software or a combination thereof.

In the present specification, an "object" means an object that may be selected by a user. Examples of the object include an icon, a link, a picture, a text, an index item, and the like. A "page" refers to space where content, information, or objects are included. Examples of the page include a web page, a content list, a thumbnail list, a tray in which pictures are arranged, and a tray in which icons are arranged.

One or more exemplary embodiments will now be described more fully with reference to the accompanying drawings in which exemplary embodiments are shown. One or more exemplary embodiments may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. For clarity, in the drawings, irrelevant portions with respect to the description are omitted, and similar reference numbers are added to similar portions throughout the entire specification. Expressions such as "at least one of," when preceding a list of elements, modify the entire list of elements and do not modify the individual elements of the list.

FIG. 1 is a structural block diagram illustrating a device 100 according to an exemplary embodiment.

The device 100 refers to a device that executes control commands generated by an eye action of a user. The device 100 may be implemented in various forms.

Examples of the device 100 include a desktop computer (personal computer (PC)), a mobile phone, a smartphone, a laptop computer, a tablet PC, an electronic book terminal, a smart TV, a digital broadcasting terminal, a personal digital assistant (PDA), a portable multimedia player (PMP), and a navigation device.

As illustrated in FIG. 1, the device 100 may include a selecting unit 110, an obtaining unit 120, a detecting unit 130, a processing unit 140, and an output unit 150. However, the illustrated components are not essential components. The device 100 may include more or less components than the illustrated ones.

Hereinafter, the components of the device 100 will be described in detail.

The selecting unit 110 may select a controller to execute a control command generated by an eye action of a user. Examples of the controller according to the current exemplary embodiment include a mouse controller, a keyboard controller, a touch input controller, a programmable controller, and a controller corresponding to an application.

According to an exemplary embodiment, the selecting unit 110 may select a controller based on a user's input. For example, when the device 100 boots up, the device 100 may display a selectable type of a controller and receive an input about the selection of at least one controller. Here, the user may select a controller by an eye action.

According to another exemplary embodiment, the selecting unit 110 may select a controller based on at least one of application information, a web browser address, device information, and usage environment information.

Additionally, the device 100 may set a mouse controller as a default controller and may switch the mouse controller to another controller according to circumstances.

The obtaining unit 120 may obtain data regarding an eye action of the user. The data about eye action may include at least one of blinking information, eye gaze position information, and eye movement speed information.

According to an exemplary embodiment, the obtaining unit 120 may obtain data about an eye action of the user from an eye-tracker including an infrared light emitting diode (LED) and a camera. According to an exemplary embodiment, the eye tracker may be manufactured in the form of eye glasses.

When the infrared LED is placed close to an axis of a camera, retina, which is rich in blood, usually reflect light, and thus, the eye pupils look brighter than usual. This is called a "bright pupil effect," and may be useful in detecting and tracking the eye pupils.

If the infrared LED (on-axis LED) installed close to the camera is turned on, the eye-tracker obtains an image from an area where the pupils shine bright, and if the infrared LED (off-axis LED) installed far from the camera is turned on, the eye-tracker may obtain an image from an area the pupils do not shine. The eye-tracker first converts the images into a black-white image so that the pupils of the brightly shining eyes may be detected from the two images, and calculates a difference between the two images so as to detect an eye action.

Additionally, the obtaining unit 120 is capable of communicating with the eye-tracker in a wired or wireless manner. Accordingly, the obtaining unit 120 may obtain data about an eye action of the user from the eye-tracker through wired or wireless communication.

Also, the obtaining unit 120 may receive a request for modifying an eye action corresponding to a predetermined control command from the user. The obtaining unit 120 may also receive eye action information corresponding to a predetermined control command from the user via an editing window.

The detecting unit 130 may detect a control command corresponding to an eye action of the user based on the obtained data about eye action. The control command refers to a command to control an operation of an input/output device.

Examples of the control command include an object selection, object movement, object editing, page conversion, application selection, application execution, and application completion.

The processing unit 140 may execute a control command detected by using the detecting unit 130 by using the selected controller. For example, when a mouse controller is selected and the user inputs a control command for moving an object by an eye action, the processing unit 140 may move the object via a drag function of the mouse controller.

The processing unit 140 may provide an editing window through which an eye action corresponding to a predetermined control command may be modified, in response to a request from the user to modify an eye action corresponding to the predetermined control command. Also, when modified eye action information corresponding to the predetermined control command is received from the user via the editing window, the processing unit 140 may generate a programmable controller that is arbitrarily defined by a user based on the modified eye action information.

For example, an eye action corresponding to a control command may be set such that when an upper portion of a general TV screen is gazed at, the channel number increases, and when a lower portion thereof is gazed at, the channel number decreases, and when a left portion thereof is gazed at, a volume decreases, and when a right portion thereof is gazed at, the volume increases.

Here, the user may modify an eye action corresponding to a predetermined control command such that when an upper portion of a TV screen is gazed at, a volume increases, and when a lower portion thereof is gazed at, the volume decreases, and when a left portion thereof is gazed at, the channel number decreases, and when a right portion thereof is gazed at, the channel number increases.

The output unit 150 outputs an audio signal, a video signal, or an alarm signal, and may include a display unit 151, an alarm unit 152, a sound output module, and the like.

The display unit 151 outputs and displays information that is processed in the device 100. For example, the display unit 151 may display content, a virtual key pad, or controller information selected by using the selecting unit 110.

Controller information according to an exemplary embodiment may include icons that display types of controllers. For example, when a mouse controller is selected, an icon having a form of a mouse may be displayed on a predetermined area of a screen, and when a keyboard controller is selected, an icon having a form of a keyboard may be displayed on a predetermined area of a screen.

In addition, the controller information according to the current exemplary embodiment may include information regarding functions provided by the selected controller. That is, the display unit 151 may display the functions provided by the selected controller in the form of a graphical user interface (GUI). This will be further described in detail below with reference to FIG. 5.

Figure 5:
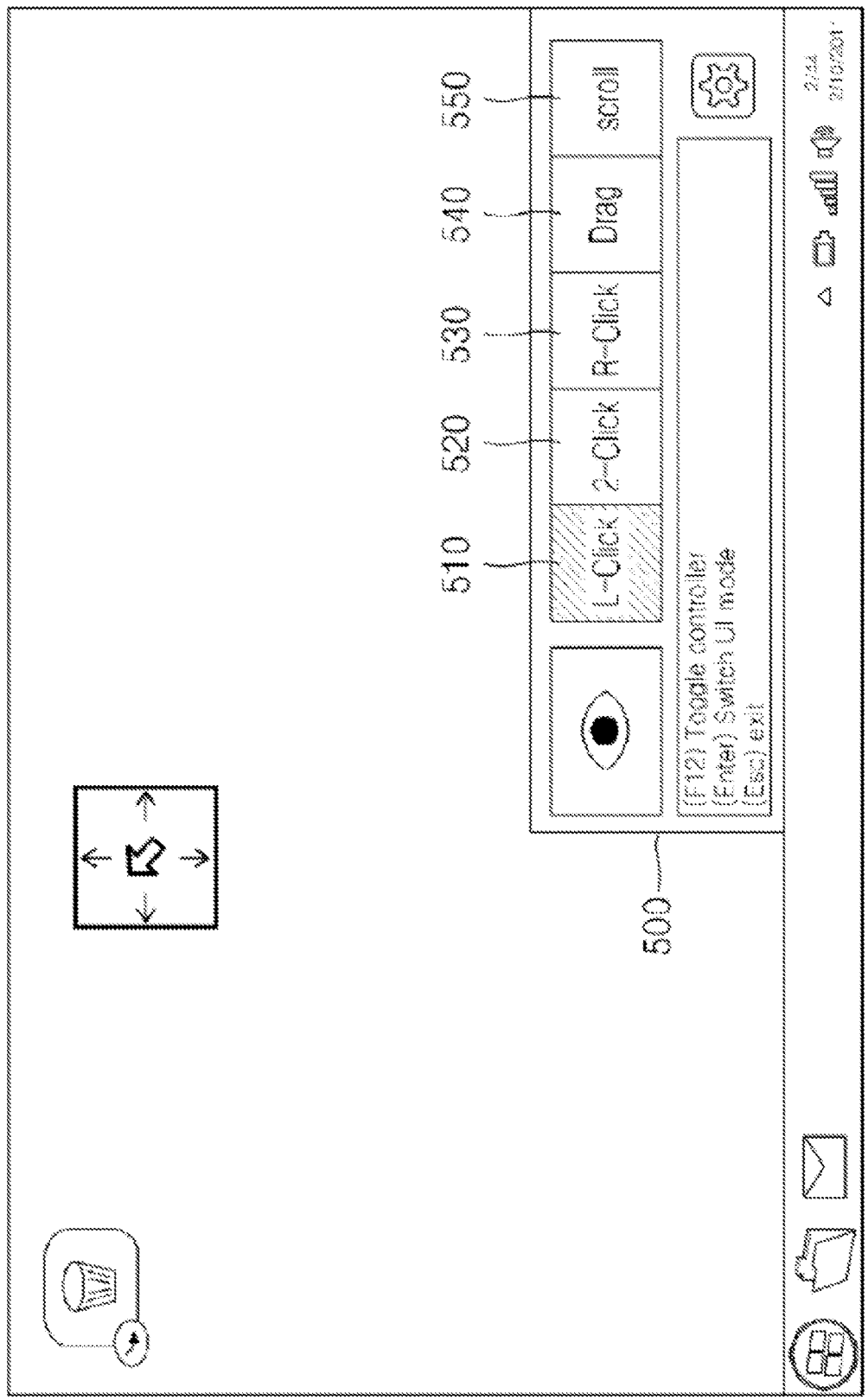
FIG. 5 is a schematic view for explaining a mouse controller according to an exemplary embodiment.

FIG. 5 is a schematic view for explaining a mouse controller 500 according to an exemplary embodiment.

As illustrated in FIG. 5, for example, when the mouse controller 500 is selected, the display unit 151 may display functions such as a left click (L-click) 510, a double click 520, a right click (R-click) 530, a drag 540, and a scroll 550 of a mouse as GUIs.

The display unit 151 may also display selectable controllers so that the user may select a controller.

Further, when the display unit 151 and a touch pad are formed as a touch screen in an interlayer structure, the display unit 151 may also be used as an input device in addition to an output device. The display unit 151 may include at least one of a liquid crystal display, a thin film transistor (TFT)-liquid crystal display (LCD), an organic light-emitting diode, a flexible display, and a three-dimensional (3D) display. In addition, at least two display units 151 may be included according to the type of the device 100. The touch screen may be formed such that not only a touch input position and a touched surface but a pressure of the touch input may be detected. Also, the touch screen may be formed such that not only a real touch described above but a proximity touch is also detected.

The alarm unit 152 outputs a signal that notifies a user about the occurrence of an event of the device 100. The alarm unit 152 may output an alarm signal when an eye action corresponding to a previously set alarm request is detected. For example, when an eye action corresponding to a previously set alarm request is an operation of closing the eyes for a predetermined period of time (e.g., three seconds) or longer, an alarm signal may be output when the user closes the eyes for a predetermined period of time (e.g., three seconds) or longer.

The alarm unit 152 may output a signal that notifies the user about the occurrence of an event, in another form different from an audio signal or a video signal. For example, the alarm unit 152 may output a signal as a vibration. Also, an output of an alarm signal may include transmitting a call signal to an external device.

Hereinafter, a method of controlling the device 100 by an eye action will be described in further detail with reference to FIG. 2.

Figure 2:
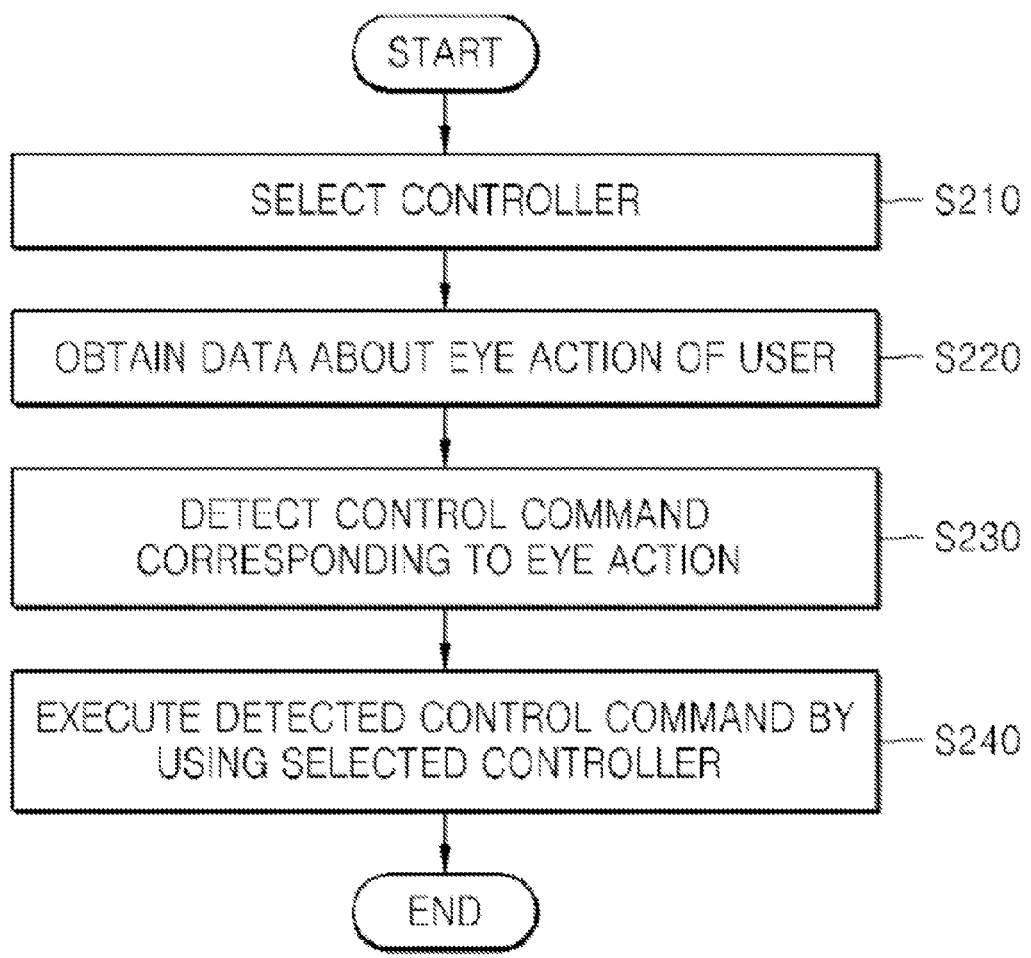
FIG. 2 is a flowchart illustrating a method of controlling at least one function of a device used in an exemplary embodiment.

FIG. 2 is a flowchart illustrating a method of controlling at least one function of the device 100 according to an exemplary embodiment.

Referring to FIG. 2, the method of controlling the device 100 includes operations that are performed in the device 100 in a time series manner, and thus, descriptions omitted herein but provided above in regard to the device 100 illustrated in FIG. 1 may also be included in the description of the controlling method of FIG. 2.

The device 100 may select a controller to execute a control command generated by an eye action of a user in operation S210. The device 100 may select a controller based on an input of a user or may automatically select a controller according to circumstances.

According to an exemplary embodiment, the device 100 may select a controller based on application information. The application information according to the current exemplary embodiment may include, for example, application identification information and an application type.

For example, when an application to be used by a user is a game application, the device 100 may select a controller that is capable of implementing a function required for a corresponding game. Here, the user may play the game by using a controller corresponding to the game application. For example, the controller may operate such that when the user gazes at the left or right side, a character runs, when the user gazes upwards, the character jumps, and when the user blinks, flames may be shot.

In addition, when the user uses a piano playing application, the device 100 may select a controller corresponding to the piano playing application. The controller corresponding to the piano playing application may be implemented such that when the user gazes at a predetermined area of a screen, a sound of a piano corresponding to the area gazed at by the user is output.

According to an exemplary embodiment, the device 100 may select a controller based on a web browser address. For example, when the user executes a web site that provides news, the device 100 may select a mouse controller so as to select news or control scrolling. In addition, when the user accesses a social network service (SNS) site (e.g., Facebook), the device 100 may select a keyboard controller so that the user may write a comment.

According to an exemplary embodiment, the device 100 may select a controller based on device information. The device information may include identification information of the device 100, a type of the device 100, or the like.

For example, when the device 100 is a TV, the selecting unit 110 may select a controller that performs a function of a TV remote controller. Also, when the device 100 is a smart phone, the selecting unit 110 may select a touch input controller. Examples of a "touch input" include tap, touch & hold, double tap, drag, panning, flick, drag and drop, and the like.

"Tap" indicates an operation in which the user touches a screen very quickly by using a finger or a touch instrument such as a stylus. That is, "tap" indicates the case where a time difference between a touch-in time when the user's finger or touch instrument contacts the screen and a touch-out time when the user's finger or touch instrument moves away from the screen is very short.

"Touch & hold" indicates an operation in which the user touches the screen by using a finger or a touch instrument such as a stylus and then the touch input is maintained for a critical time or more. That is, "touch & hold" means a case where a time difference between the touch-in time and the touch-out time is equal to the critical time or longer. In order to allow the user to recognize whether a touch input is a tap or a touch & hold, if the touch input is maintained for the critical time or more, a feedback signal may be provided to the user visually or by an auditory output.

"Double tap" indicates an operation in which the user touches the screen twice quickly by using a finger or a touch instrument such as a stylus.

"Drag" indicates an operation in which the user touches the screen by using a finger or a touch instrument and moves the finger or touch instrument to another position on the screen while maintaining the contact between the finger or touch instrument and the screen. When a drag operation is performed, an object may be moved, or a panning operation that is described below is performed.

"Panning" indicates a case where the user performs a drag operation without selecting an object. Because in the panning operation a particular object is not selected, the object is not moved within a page but the page itself is moved in the screen or a group of objects is moved within the page.

"Flick" indicates an operation in which the user performs a drag operation very quickly by using a finger or a touch instrument. The drag (or panning) operation and the flick operation may be discriminated from each other depending on whether the speed of moving the touch instrument is a critical speed or more.

"Drag & drop" indicates an operation in which the user drags an object to a predetermined position on the screen and then drops the object by terminating the contact between the finger or touch instrument and the screen.

According to an exemplary embodiment, the device 100 may select a controller based on usage environment information. Usage environment information refers to information regarding an environment in which the device 100 is used. Examples of the usage environment information include a viewer mode, an input mode, and an editing mode.

For example, when a viewer mode is set, the device 100 may select a mouse controller. When an input mode is set, the device 100 may select a keyboard controller. Also, when the input mode is set, the device 100 may select a mouse controller and display a virtual key pad. When an editing mode is set, the device 100 may select a controller corresponding to an editing tool or a programmable controller arbitrarily defined by a user.

The device 100 may obtain data about an eye action of the user in operation S220. Data about an eye action according to an exemplary embodiment may include at least one of eye blinking information, eye gaze position information, and eye movement speed information. Examples of the eye blinking information include blinking speed and blinking times. The eye action will be described in further detail with reference to FIGS. 3 and 4.

FIG. 3 is a schematic view for explaining an eye action according to an exemplary embodiment.

Examples of an eye action according to the current exemplary embodiment may include an operation of keeping the eyes open (open), an operation of blinking the eyes (blink), an operation of closing the eyes for a short period and opening the eyes again (short_click), an operation of closing the eyes for a long period and opening the eyes again (long_click), an operation of keeping the eyes closed (close), and an operation of gazing at a predetermined area of a screen for a predetermined period of time or longer (dwell). An eye tracker may track an eye action of the user, and transmit the collected eye action to the device 100.

Figure 4A:
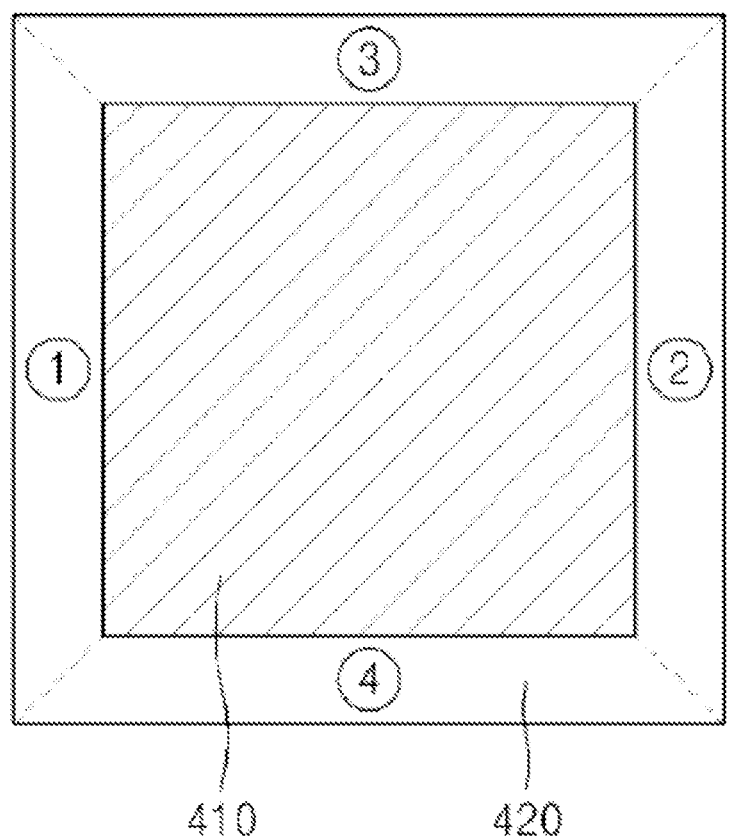
FIGS. 4A, 4B, and 4C illustrate a screen area corresponding to a gaze position of eyeballs, according to one or more exemplary embodiments.
Figure 4B:
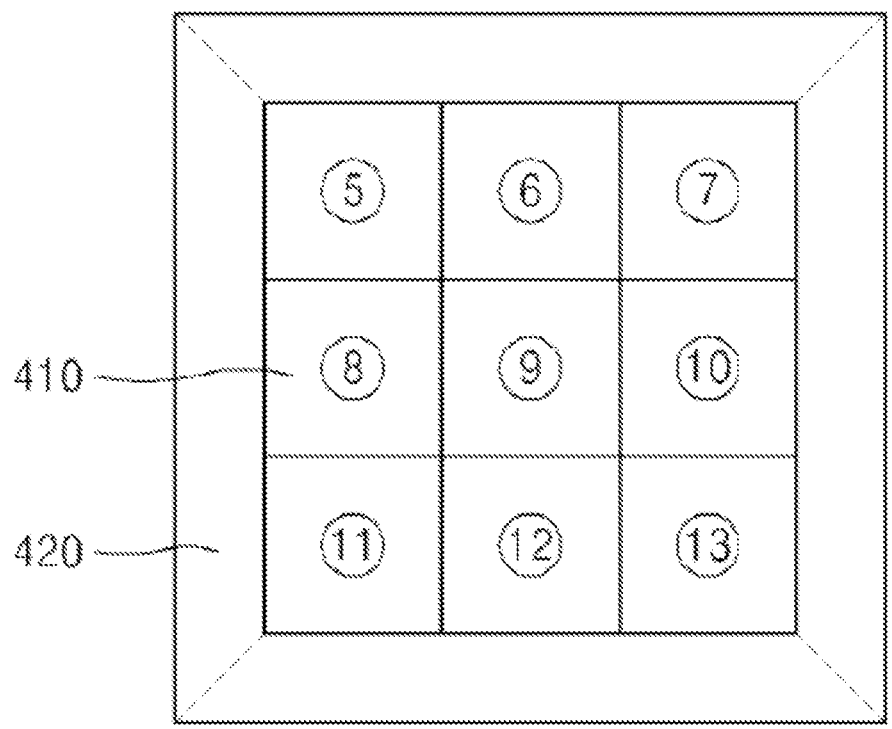
Figure 4C:
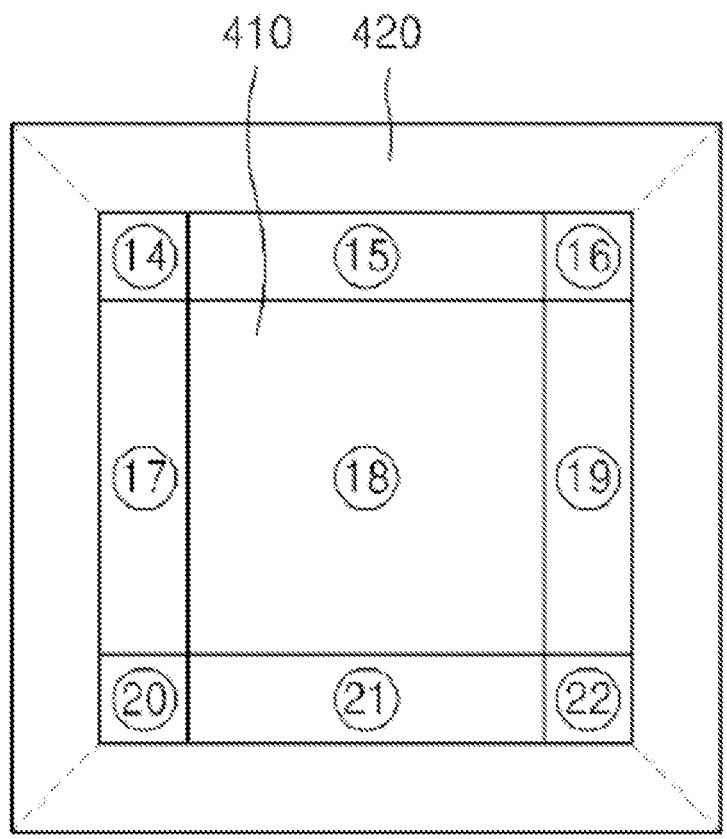

FIGS. 4A through 4C illustrate a screen area corresponding to eye gaze positions according to exemplary embodiments. The user may generate various types of control commands by gazing at different areas in and out of a screen.

FIG. 4A illustrates an area 420 outside a screen. The area 420 outside a screen may include a left-side area 1, a right-side area 2, an upper area 3, and a lower area 4.

FIG. 4B illustrates an area 410 inside a screen, which is uniformly divided. The screen is divided into nine portions in FIG. 4B, however, the number of divided portions of the screen is not limited thereto. Referring to FIG. 4B, the area 410 inside a screen may include an upper left area 5, an upper central area 6, an upper right area 7, a central left area 8, a central area 9, a central right area 10, a lower left area 11, a lower central area 12, and a lower right area 13. Additionally, the area 410 inside a screen may also be divided into areas along a horizontal direction, that is, horizontal central areas 8, 9, and 10, and areas along a vertical direction, that is, central vertical areas 6, 9, and 12.

FIG. 4C illustrates edge areas inside a screen. If a lot of content is displayed on a screen, the device 100 may expand a central area where some content is displayed by a predetermined ratio, and an area the eyes gaze at and via which a control command is to be input may be disposed on an edge of a screen. The edge areas may include an upper left edge area 14, an upper central edge area 15, an upper right edge area 16, a central left upper area 17, a central area 18, a central right edge area 19, a lower left edge area 20, a lower central edge area 21, and a lower right edge area 22.

According to an exemplary embodiment, various commands may be generated by combining an eye action and an eye gaze area. For example, when the user gazes at the left-side area 1 outside the screen, then closes the eyes and opens the eyes again (click), a control command 'A' may be input. Also, when the user gazes at the upper right edge area 16 inside the screen for a predetermined period of time or longer (dwell), a control command 'B' may be input.

The device 100 may detect a control command corresponding to eye action of the user based on data about the eye action of the user in operation S230. According to an exemplary embodiment, a control command corresponding to an eye action may be defined in advance and stored in a memory.

For example, the device 100 may be set such that an eye action where the user gazes at a right-side area of a screen and blinks one time corresponds to 'a next page request command' and an eye action where the user gazes at a left-side area of a screen and blinks one time corresponds to 'a previous page request command.' That is, when the user gazes at a right-side area of a screen and blinks one time, the device 100 detects a 'next page request command' from among previously stored control commands.

The device 100 may execute the detected control command by using the selected controller in operation S240, as shown in FIG. 2. For example, when a control command referred to as 'a next page request command' is detected and the selected controller is a mouse controller, the next page request command may be executed by using a click function of the mouse controller. Also, when the device 100 is a smart phone, a touch input controller may be selected instead of a mouse controller, and the next page request command may be executed by a tap gesture from among various touch inputs.

Figure 6:
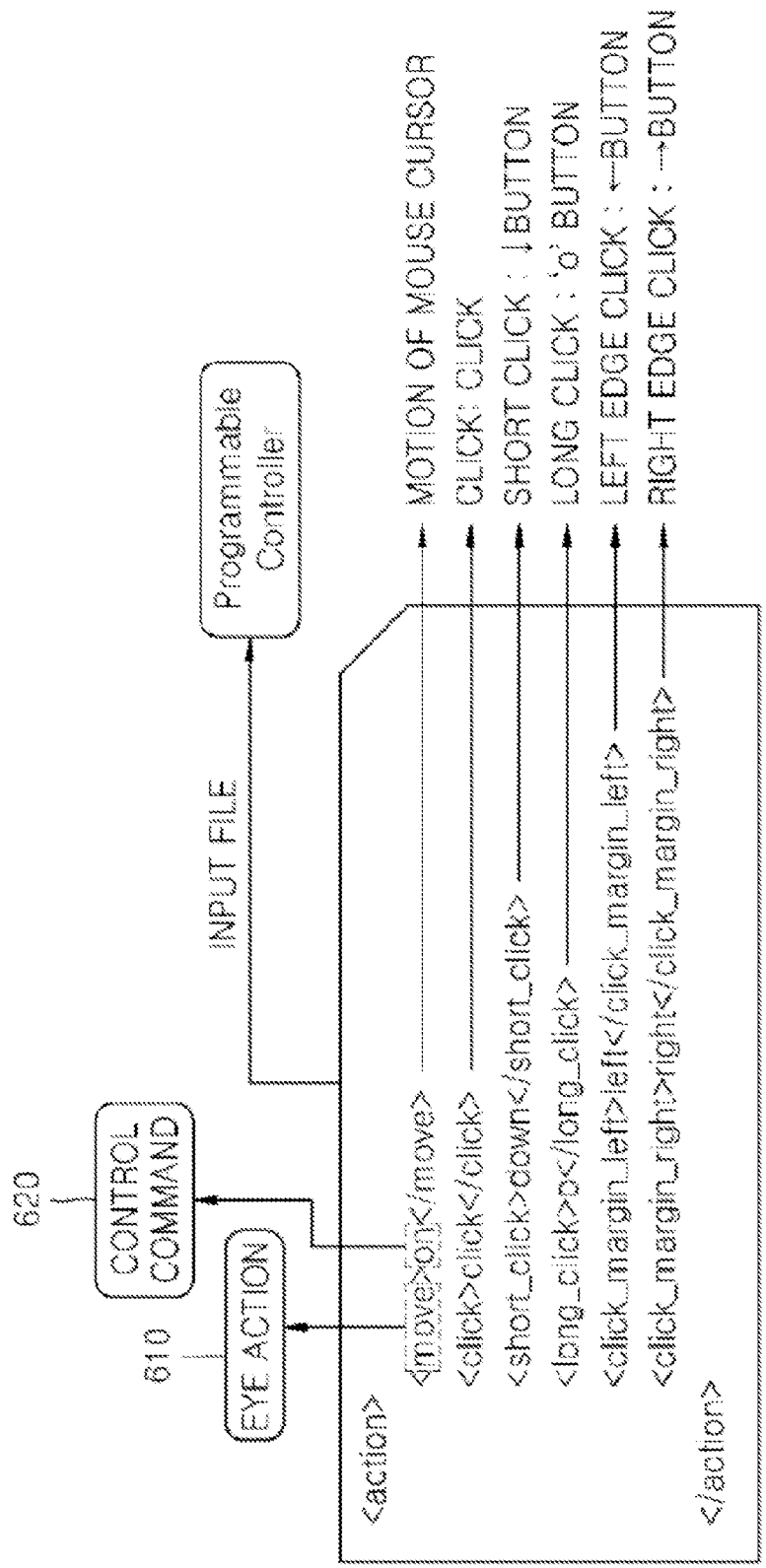
FIG. 6 is a schematic view for explaining a programmable controller arbitrarily defined by a user, according to an exemplary embodiment.

FIG. 6 is a schematic view for explaining a programmable controller arbitrarily defined by a user, according to an exemplary embodiment.

As illustrated in FIG. 6, the user may generate a programmable controller by defining an eye action 610 and a control command 620 corresponding thereto. For example, the user may match an operation of moving the eyes to a motion of a mouse cursor, and an operation of closing the eyes and opening the eyes again to a click of a mouse, and an operation of closing the eyes for less than a predetermined period and then opening the eyes again to a '↓ button' of a keyboard, and an operation of closing the eyes for a predetermined period of time or longer and opening the eyes again to a '○ button' of a keyboard, an operation of gazing at a left edge area of a screen, closing the eyes for less than a predetermined period of time, and opening the eyes again to a '←- button,' an operation of gazing at a right edge area of a screen, closing the eyes for less than a predetermined period of time, and opening the eyes again to a '→ button.'

According to an exemplary embodiment, the user may link operations defined as default in a PC or a mobile device (mouse/keyboard) to predetermined eye actions, and thus, user convenience may be increased.

Figure 7:
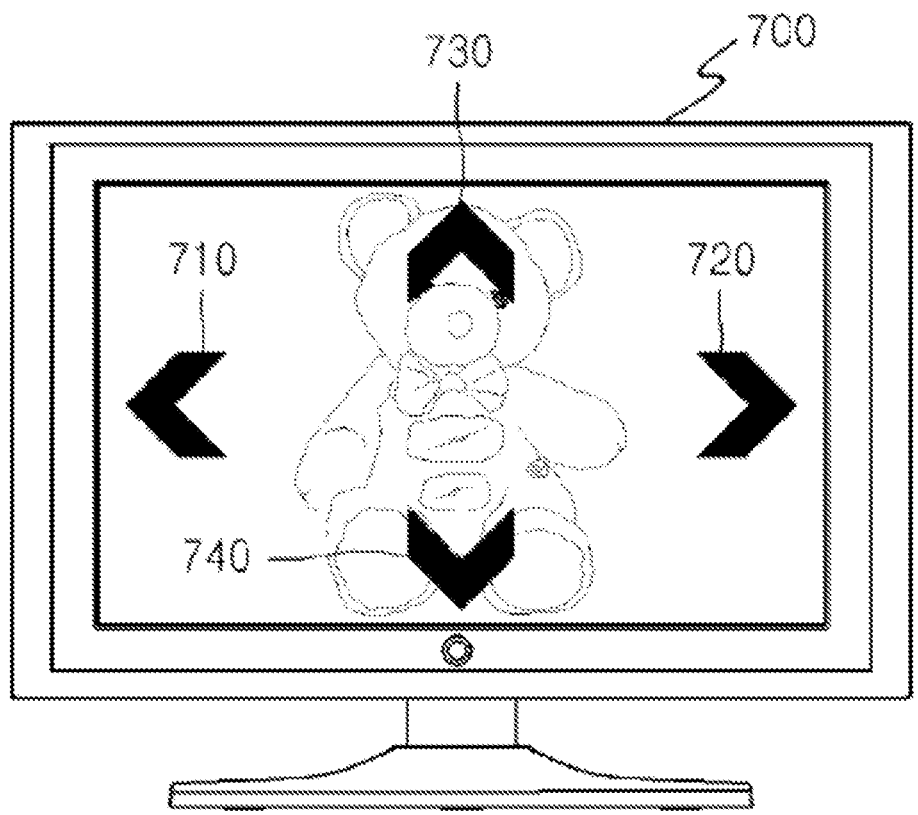
FIG. 7 is a schematic view for explaining a method of controlling a TV according to an exemplary embodiment.

FIG. 7 is a schematic view for explaining a method of controlling a TV according to an exemplary embodiment.

As illustrated in FIG. 7, when the device 100 is a TV, a controller corresponding to a TV may be selected. Here, a controller corresponding to a TV may operate as follows. When the user quickly blinks while gazing at a left-side area 710 of a TV screen 700 and then moves the eyes out to the left, a volume is reduced; when the user quickly blinks while gazing at a right-side area 720 and then moves the eyes out to the right, the volume is increased; when the user quickly blinks while gazing at an upper area 730 and then moves the eyes out of an upper portion of the TV screen 700, a channel number is increased, and when the user quickly blinks while gazing at a lower area 740 and then moves the eyes out of a lower portion of the TV screen 700, the channel number is reduced.

Figure 8A:
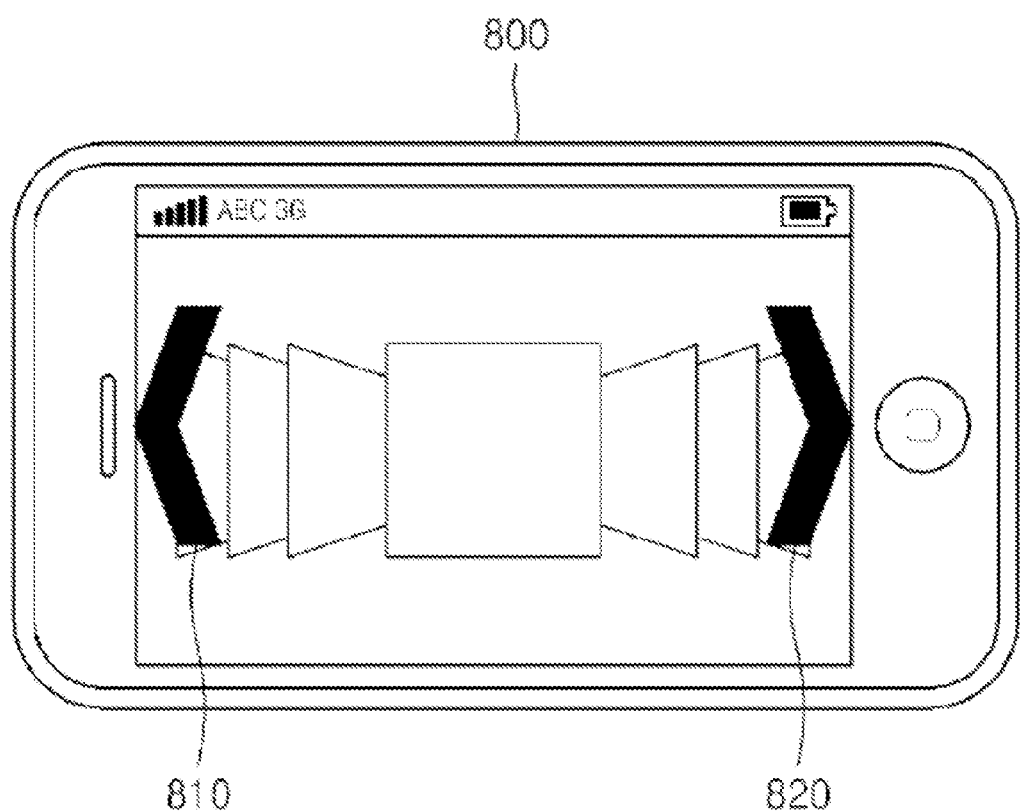
FIGS. 8A and 8B are schematic views for explaining a method of controlling a mobile terminal according to one or more exemplary embodiments.
Figure 8B:
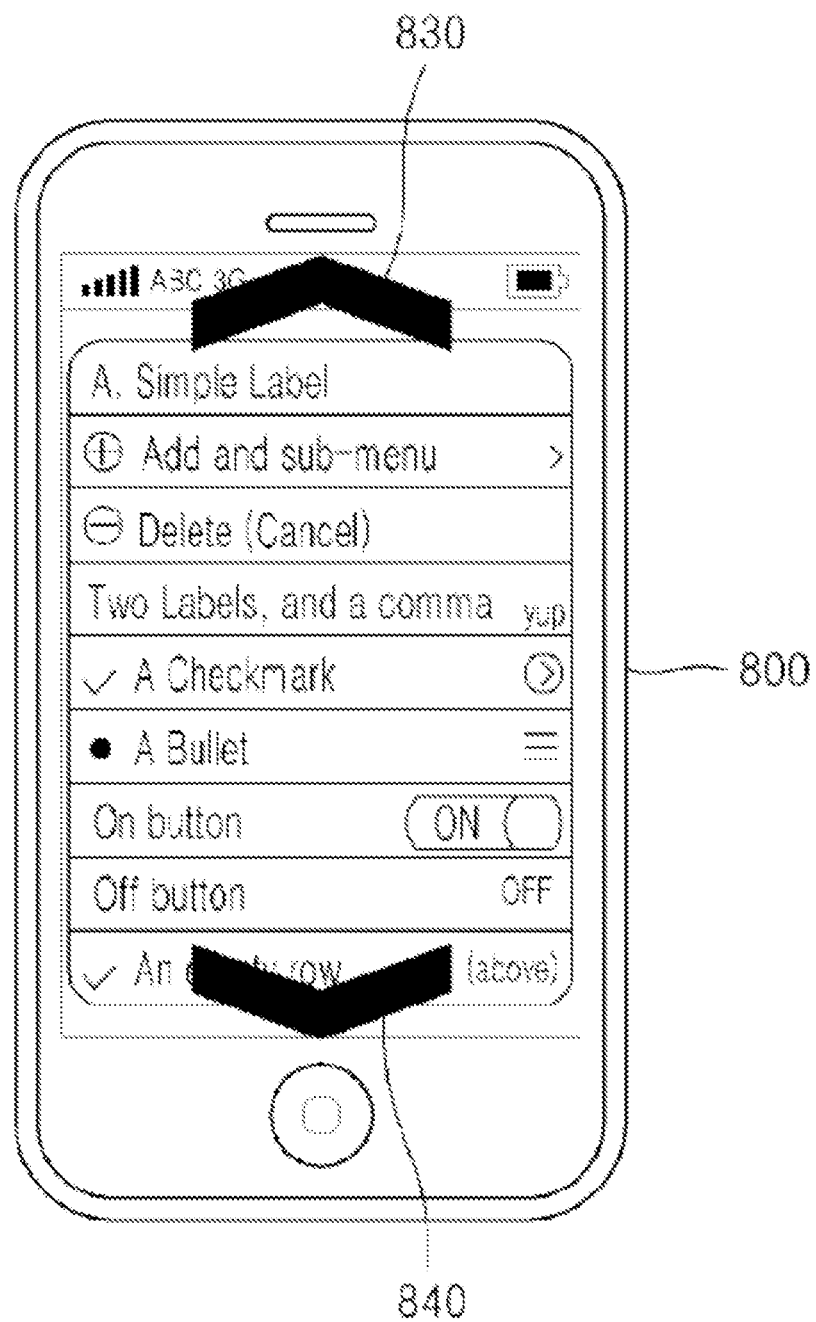

FIGS. 8A and 8B are schematic views for explaining a method of controlling a mobile terminal according to an exemplary embodiment.

As illustrated in FIG. 8, when the device 100 is a mobile device, a touch input controller corresponding to the mobile device may be selected. In this case, the touch input controller may swipe a screen according to an eye action and eye gaze positions of the user in upward or downward directions or to the left or right. Also, when the user blinks quickly for a predetermined of time or more while gazing at a predetermined area, an object present in the predetermined area may be selected.

Further, as illustrated in FIG. 8B, if there are a plurality of objects that may be selected by the user, it may be difficult for the user to accurately select an object by an eye action. Accordingly, the device 100 may highlight a corresponding object as an object selected by the user when an eye gaze position exists within a predetermined radius of the corresponding object.

Figure 9A:
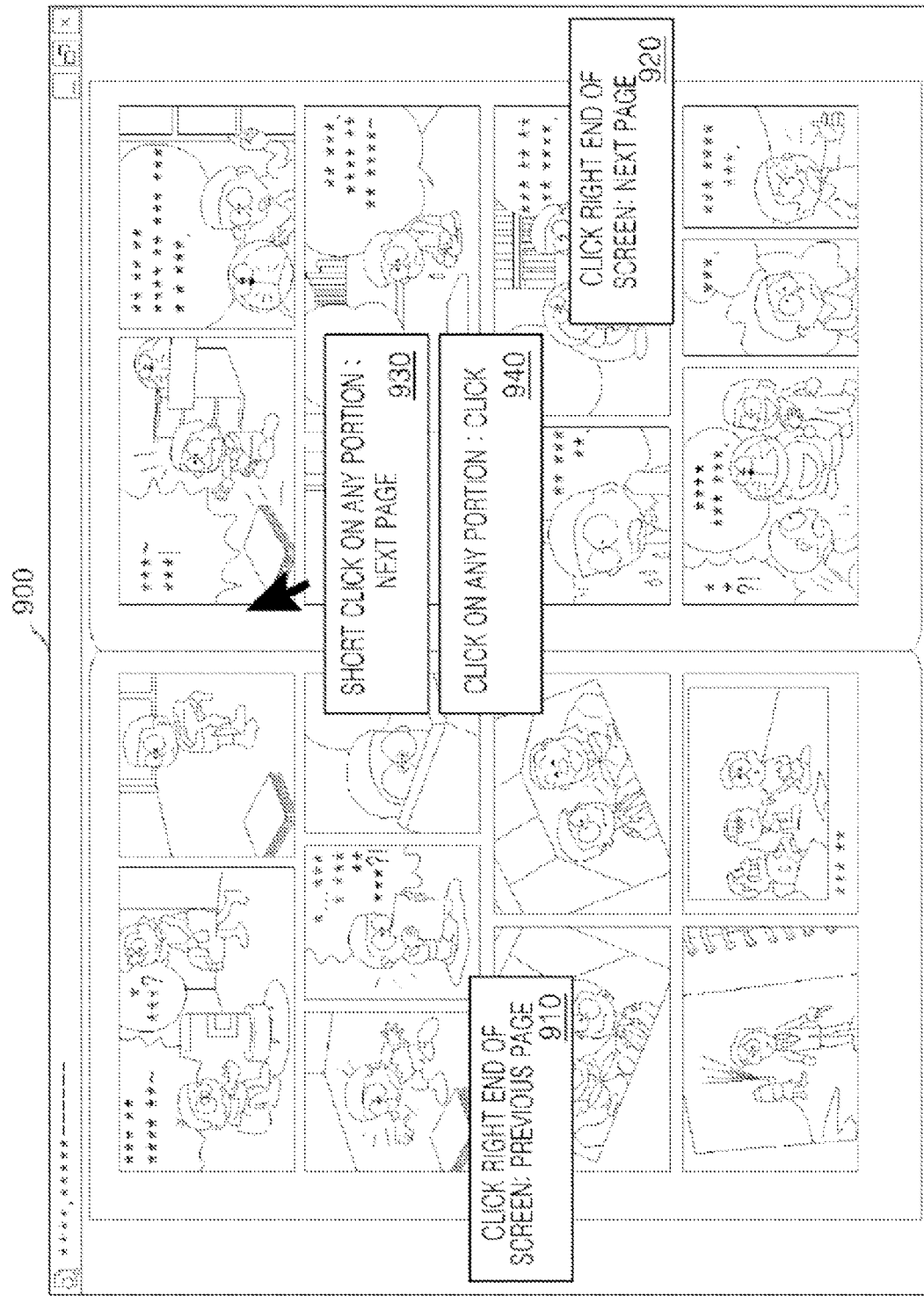
FIGS. 9A and 9B are schematic views for explaining a method of controlling an electronic book (E-book) according to one or more exemplary embodiments.
Figure 9B:
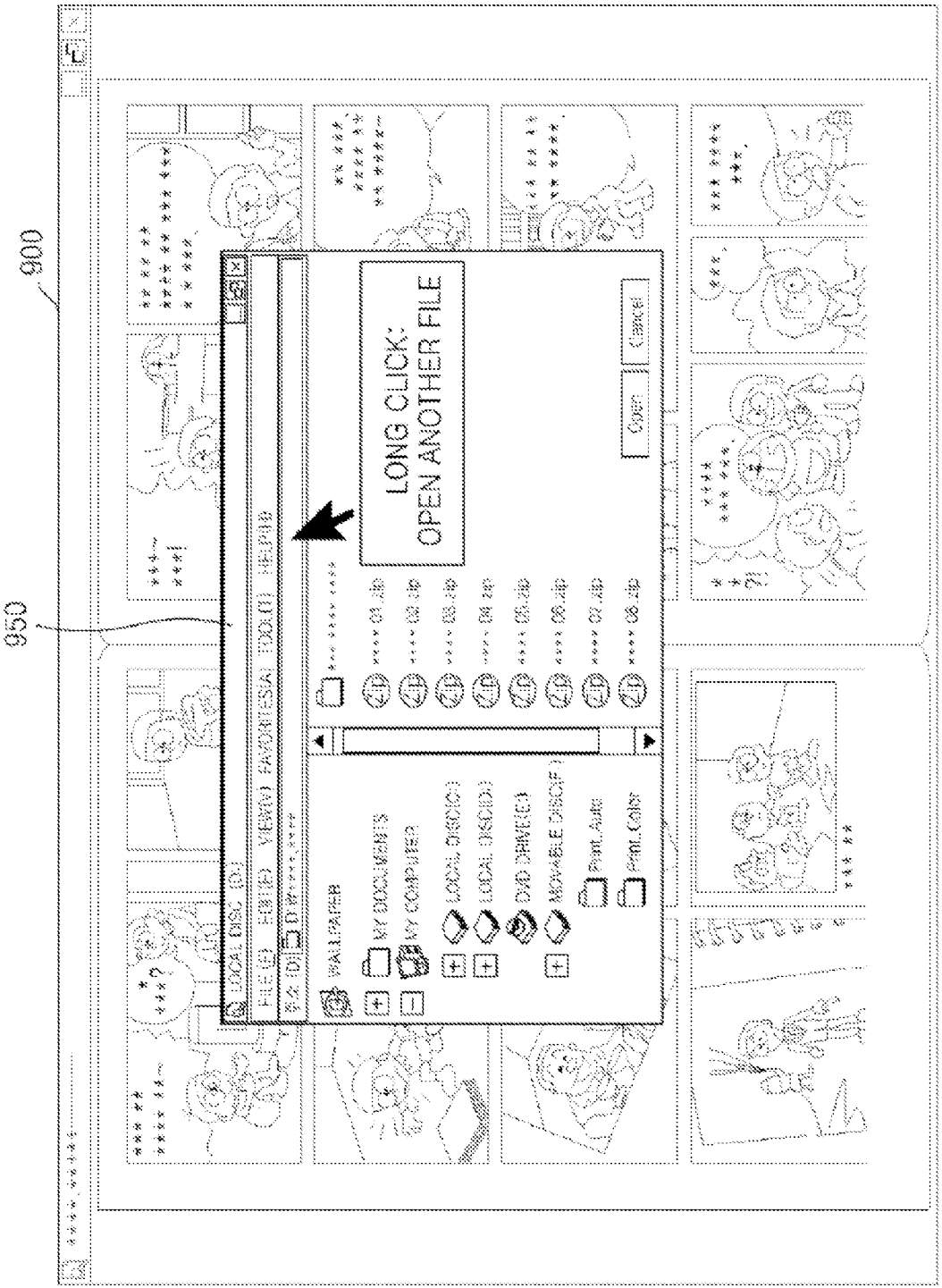

FIGS. 9A and 9B are schematic views for explaining a method of controlling an electronic book (E-book) according to an exemplary embodiment.

When the device 100 is an E-book as illustrated in FIGS. 9A and 9B, the selecting unit 110 may select a controller corresponding to an E-book.

As illustrated in FIG. 9A, when the user closes the eyes and opens the eyes while gazing at a left edge of a screen, the controller corresponding to an E-book displays a previous page 910; when the user closes the eyes and opens the eyes again while gazing at a right edge of a screen, the controller may display a next page 920. Also, when the user has closed the eyes less than a predetermined period of time and then opens the eyes again while gazing at any area of a screen (short_click), the controller corresponding to an E-book may display a next page 930; when the user closes the eyes and then opens again while gazing at any area of a screen (click), the controller may display content by expanding the content by a predetermined ratio (940).

As illustrated in FIG. 9B, when the user opens the eyes after closing the eyes for a predetermined period of time or longer (long_click), the controller corresponding to an E-book may display a content list (950) via which other content may be selected.

Figure 10:
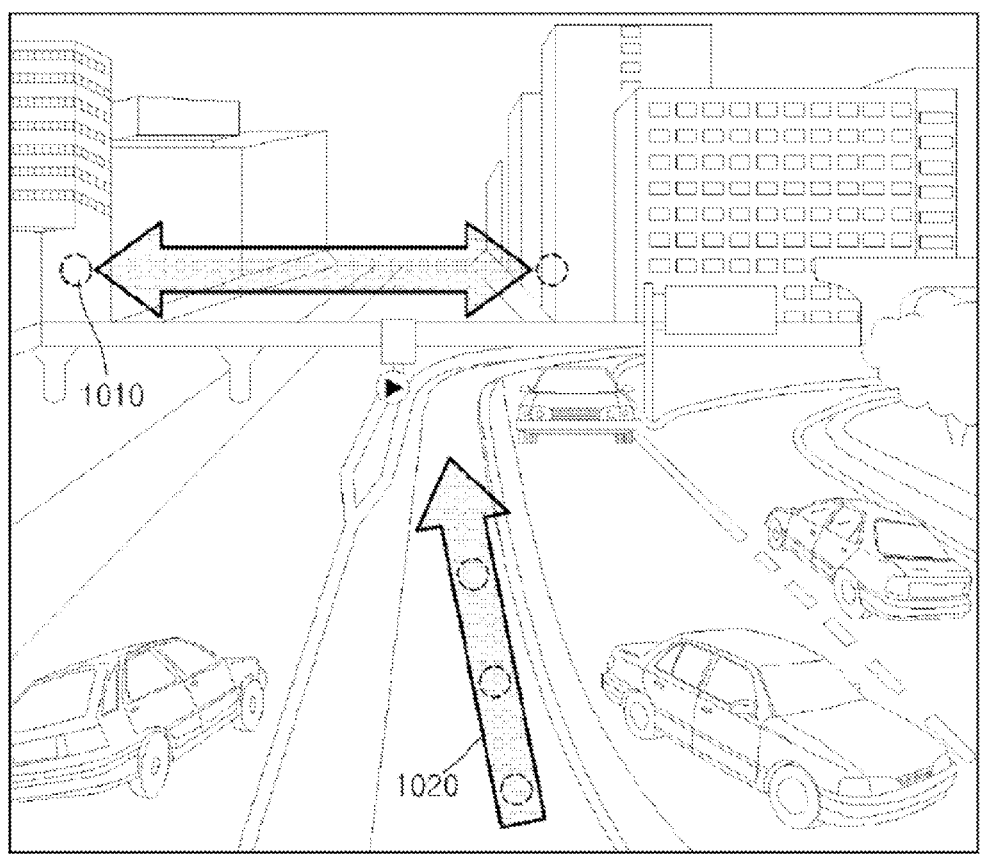
FIG. 10 is a schematic view for explaining a controller corresponding to an application in an exemplary embodiment.

FIG. 10 is a schematic view for explaining a controller corresponding to an application, according to an exemplary embodiment.

As illustrated in FIG. 10, when an application selected by a user is a map application, the selecting unit 110 may select a controller corresponding to the map application.

According to an exemplary embodiment, when the user changes an eye gaze position, the controller corresponding to the map application may modify a viewpoint on a map according to the changed eye gaze position as denoted by an arrow 1010.

Also, when the user blinks after gazing in a predetermined direction, the controller corresponding to the map application may provide a driving function in the predetermined direction as denoted by an arrow 1020.

The method can be performed by program commands that can be executed in a computer and can be recorded on a non-transitory computer-readable recording medium.

Examples of the non-transitory computer-readable recording medium can include program commands, data files, data structures, and the like in a single or combination form. The program commands recorded on the non-transitory computer-readable recording medium can be particularly designed and configured for one or more exemplary embodiments or can be well-known to one of ordinary skill in computer software. Examples of the non-transitory computer-readable recording mediums include hardware devices that are particularly configured to store and execute program commands, such as hard disks, floppy disks, magnetic media, such as magnetic tapes, optical media, such as CD-ROMs or DVDs, magneto-optical media, such as floptical disks, read-only memory (ROM), random-access memory (RAM), flash memory, etc. Examples of the program commands include advanced language codes that can be executed in a computer by using an interpreter, as well as mechanical language codes that are made by a compiler.

According to an exemplary embodiment, the device 100 may allow user to control many kinds of input apparatuses including a mouse by using an eye action.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of controlling at least one function of a device by using an eye action, the method comprising:
generating a controller based on a modification via an editing window mapping an eye action of a user to a predetermined control commands;
selecting the controller based on a user's input or an automatic control by software to execute a control command generated by the eye action of the user;
obtaining data about the eye action of the user;
detecting the control command corresponding to the eye action of the user based on the obtained data; and
executing the detected control command by using the selected controller.

2. The method of claim 1, wherein the automatic control by the software comprises an automatic control by at least one of application information and a web browser address.

3. The method of claim 1, wherein the automatic control by the software comprises an automatic control by at least one of device information and usage environment information.

4. The method of claim 1, wherein the controller is at least one selected from among a mouse controller, a keyboard controller, a touch input controller, a programmable controller defined by the user, and an application controller corresponding to an application.

5. The method of claim 1, wherein the data about the eye action comprises at least one from among eye blinking information, eye gaze position information, and eye movement speed information.

6. The method of claim 1, further comprising:
displaying information about the selected controller.

7. The method of claim 1, further comprising:
outputting an alarm signal in response to the eye action corresponding to a previously set alarm request being detected.

8. The method of claim 1, further comprising:
receiving a request to modify the eye action corresponding to the predetermined control command from the user;
providing the editing window to modify the eye action corresponding to the predetermined control command in response to the request;
receiving modified eye action information corresponding to the predetermined control command from the user via the editing window; and
generating the controller defined by the user based on the modified eye action information.

9. A device comprising:
a processing unit configured to generate a controller based on a modification via an editing window mapping an eye action of a user to a predetermined control command;
a selecting unit configured to select the controller based on the user's input or an automatic control by a software configured to execute a control command that is generated by the eye action of the user;
an obtaining unit configured to obtain data about the eye action of the user; and
a detecting unit configured to detect the control command corresponding to the eye action of the user based on the obtained data,
wherein the processing unit is further configured to execute the detected control command by using the selected controller.

10. The device of claim 9, wherein the automatic control by the software comprises an automatic control by at least one of application information and a web browser address.

11. The device of claim 9, wherein the automatic control by the software comprises an automatic control by at least one of device information and usage environment information.

12. The device of claim 9, further comprising:
a display unit configured to displays information about the selected controller.

13. The device of claim 9, further comprising:
an alarm unit configured to outputs an alarm signal response to the eye action corresponding to a previously set alarm request being detected.

14. A non-transitory computer readable recording medium having embodied thereon a program for executing the method of claim 1.

* * * * *